M. C. SCHWEINERT AND H. P. KRAFT.
INFLATING COUPLING.
APPLICATION FILED MAR. 19, 1917.
1,330,397. Patented Feb. 10, 1920.
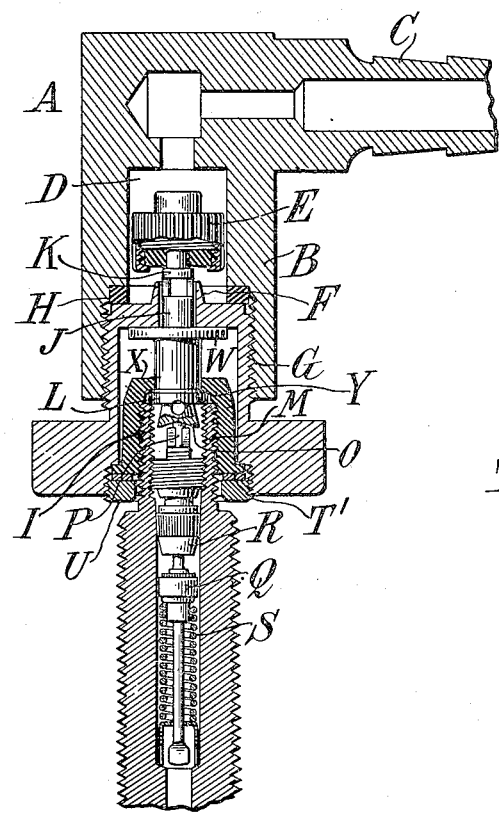
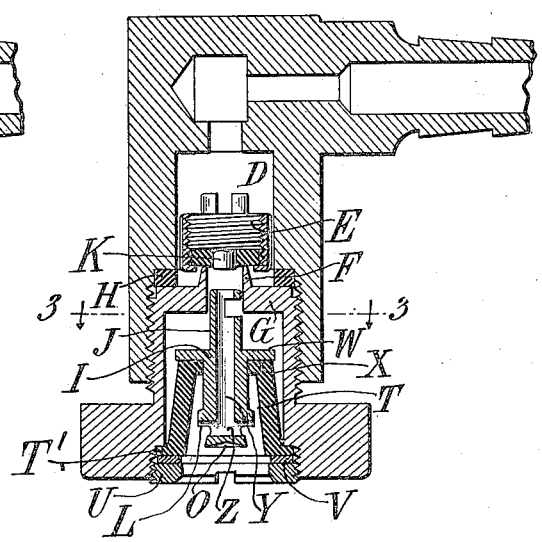
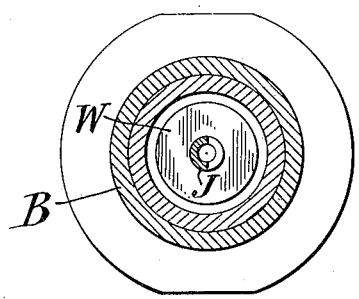
INVENTORS:
Maximilian Charles Schweinert
and Henry P. Kraft
By Attorneys,

UNITED STATES PATENT OFFICE.

MAXIMILIAN CHARLES SCHWEINERT, OF WEST HOBOKEN, AND HENRY P. KRAFT, OF RIDGEWOOD, NEW JERSEY.

INFLATING COUPLING.

1,330,397.　　　　　Specification of Letters Patent.　　Patented Feb. 10, 1920.

Application filed March 19, 1917. Serial No. 155,780.

*To all whom it may concern:*

Be it known that we, MAXIMILIAN CHARLES SCHWEINERT and HENRY P. KRAFT, citizens of the United States of America, residing in West Hoboken, in the county of Hudson and State of New Jersey, and Ridgewood, in the county of Bergen and State of New Jersey, respectively, have invented certain new and useful Improvements in Inflating Couplings, of which the following is a specification.

This invention relates to inflating couplings and aims to provide certain improvements therein.

Couplings of this type are especially adapted to be used in connection with tanks of compressed air, the coupling being secured at the end of a pipe line leading from the tank and being adapted to be connected with a tire valve, usually by pressing the coupling down upon the nipple of the valve. Such couplings are provided with an automatic check valve which normally prevents the escape of the air, which check valve is opened by the pressure of the coupling upon the tire valve. For this purpose a valve opener is arranged within the coupling, and in former constructions this valve opener has been adapted to engage either the nipple of the tire valve or the pin of the valve. In those couplings which have engaged the valve nipple, the pressure of air within the pipe line has been relied upon to open the tire valve. In this type, however, the inflation is subject to the back pressure of the tire valve. In those constructions in which the opener is actuated by pressing against the valve pin, there is the disadvantage that this pin is fragile and not intended or adapted for receiving the relatively heavy thrust which is thus imposed upon it. According to the present invention we obtain the advantages of both constructions and the disadvantages of neither. To this end we provide a coupling having a valve opener which is adapted to engage the valve nipple and which at the same time is adapted to open the tire valve, the opening movement, however, being limited to such extent that no strain on the tire valve can take place. The invention also includes certain other features of improvement which will be hereinafter more fully described.

In the drawings wherein we have illustrated the preferred form of our invention,—

Figure 1 is a central vertical section showing the invention as applied to a tire valve with the inflating coupling open;

Fig. 2 is a similar section showing the coupling removed from the valve and being in closed condition;

Fig. 3 is a cross section on the line 3—3 in Fig. 2.

Referring to the drawings, let A indicate the coupling as a whole, which is shown as comprising a cylinder B and an angled connection C adapted to be connected to the pipe line supplying air under pressure. The cylinder B is formed with a valve chamber D within which works a check valve E which is adapted to coact with a seat F formed upon a seat member G. The seat member preferably screws into the cylinder, a tight joint between the two being formed by a packing H. The valve E is normally held against the seat F by pressure within the pipe line so that no air can escape. To open the valve when the coupling is applied to a tire valve, a valve opener I is provided. The latter has a valve opening element J extending up through the seat F and contacting with an abutment K whereby the valve is lifted.

According to the present invention means are provided for actuating the valve opener by engagement with the nipple or other part of the tire valve casing. Means are also provided for opening the tire valve so that air may flow into the latter without encountering the back pressure which is set up by the tire valve. These results may be accomplished in any suitable way; but we have shown in the drawing the construction which we prefer for this purpose on account of its simplicity. In this construction the valve opener is formed with a shoulder L which is adapted to engage the valve nipple M as shown in Fig. 1. By pressing down on the coupling the opener lifts the valve E as before described. This action requires considerable force, the strain, however, being taken by the metal of the valve shell. Below the shoulder L is arranged an abutment O which is of sufficiently small diameter to enter the valve nipple and which is adapted to engage the tire valve pin P with the result that the tire valve check Q is forced from its seat R, thus opening the tire valve to the incoming passage of air. The abutment O extends below the shoulder preferably only a short distance so as to avoid placing any particular strain upon the valve pin P and spring S. In those constructions wherein the valve opener is pressed against the pin for the purpose of opening the valve E, sufficient resistance cannot be obtained until the pin is pressed down as far as it will go. This is very detrimental to the tire valve.

In the construction shown we provide a bell or cone shaped washer T which is constructed of rubber and which is held in the seat member by flanges T' which are clamped against the seat member by a screw-threaded collar U so as to make a tight joint between the edges of the washer T and the seat member. In order to avoid distortion of the flange T' we prefer to introduce a ring V between the flange and the collar, the ring permitting the collar to rotate without rotating or distorting the flange T'. We prefer to vulcanize the ring V to the flange T' so that distortion is better prevented and loss of the ring is avoided when the parts are disassembled. The valve nipple is adapted to be forced into the interior of the washer T as shown in Fig. 1, the air pressure when the valve E is open causing the washer to hug the threaded exterior of the nipple very closely, thus not only providing a tight joint between the two, but also securing a firm mechanical connection between the coupling and the tire valve so that it is not necessary to manually hold the coupling on the valve.

The valve opener I is preferably formed with a flange W which normally bears against the crown X formed on the packing T and keeps the opener from falling out. The crown X has a central opening which closely fits the neck Y of the opener, and the shoulder L of the opener is formed as an external flange which, when lifted, is pressed against the under face of the crown.

The operation of the device will be apparent. When the coupling is pressed down the nipple enters the packing whereupon the abutment O contacts with the valve pin, thus opening the valve. A slight movement further downward contacts the shoulder L with the valve nipple, thus pressing up the valve opener and opening the valve E. The lift of the opener is stopped by the flange W striking against G, and the packing T which receives air pressure around it is pressed inward against the nipple, and inward and downward against the neck Y and flange L of the opener, and thus makes a tight joint between the nipple and opener. Air then flows down through the neck Y of the valve opener and thence laterally through the opening Z to the tire valve.

While we have shown and described one form of the invention, it will be understood that we do not wish to be limited thereto since various changes may be made therein without departing from the spirit of the invention.

What we claim is:—

1. An inflating coupling having a check valve, and a separate valve opener for unseating such valve, the valve opener having means to be engaged by the tire valve casing to displace the opener, and having means to engage the pin of the tire valve to open the latter, and packing means surrounding the opener for making a tight joint between the opener and tire valve nipple.

2. An inflating coupling having a check valve and a separate valve opener, said valve opener having an annular shoulder to engage a tire valve casing and a part to engage the pin of the tire valve whereby to open the tire valve, and a cup-shaped packing surrounding and overlying said shoulder, and adapted to make a tight joint between the opener and valve nipple.

3. An inflating coupling having a check valve and a valve opener, said valve opener having a shoulder adapted to engage a tire valve nipple, and an abutment adapted to engage a tire valve pin, and a yielding packing for preventing leakage from between the opener and valve nipple.

4. An inflating coupling having a check valve, and a valve opener therefor, said valve opener comprising a tubular member one end of which is adapted to engage the check valve and the other end of which is provided with a shoulder to engage a tire valve nipple, and below such shoulder with an abutment to engage a tire valve pin, and lateral passages above said abutment leading to the interior of said opener, and a cup-shaped packing member overlying and surrounding said shoulder.

5. An inflating coupling having a check valve, a valve opener therefor, a cone shaped packing washer at the lower end of said coupling, said opener extending through the upper end of said packing washer and having a portion adapted to engage the end of a valve nipple whereby to move said opener, said packing washer conforming to the opener and nipple to make a tight joint between them.

6. An inflating coupling having a check valve, a valve opener therefor, a cone shaped packing washer at the lower end of said coupling, said opener extending through the upper end of said packing washer and having a portion adapted to engage the end of a valve nipple whereby to move said opener, and said opener having a flange resting in one position against the top of said packing washer and in another position adapted to contact with a part of the coupling whereby to restrict its upward movement.

7. An inflating coupling having a check valve, a valve opener therefor, a cone shaped packing washer at the lower end of said coupling, said opener extending through the upper end of said packing washer and having a portion adapted to engage the end of a valve nipple whereby to move said opener, and said opener having a projecting abutment adapted to depress a tire valve pin, and said packing washer embracing said opener and adapted to conform thereto under pressure.

8. An inflating coupling having a check valve, an opener therefor, and a packing washer, a collar for clamping said packing washer to an anti-friction device between said collar and the packing washer.

9. An inflating coupling having a check valve, an opener therefor, and a packing washer, a collar for clamping said packing washer to an anti-friction device between said collar and the packing washer, and an anti-friction ring between said collar and said packing washer, said ring being vulcanized to said packing washer.

10. An inflating coupling having a check-valve and a valve-opener, and a cup-shaped packing washer embracing said opener and adapted to receive within it the nipple of a tire valve and shaped to make a tight joint between such nipple and opener.

11. An inflating coupling having a check-valve and a valve-opener, and a cup-shaped packing washer embracing said opener and adapted to receive within it the nipple of a tire valve and inclosed within a chamber to which compressed air is admitted upon the application of such tire valve to open such check-valve, and adapted to yield to such air pressure and be thereby contracted around the valve nipple and opener, to make a tight joint with the nipple and between the nipple and opener.

In witness whereof, we have hereunto signed our names.

MAXIMILIAN CHARLES SCHWEINERT.
HENRY P. KRAFT.